A. B. KINGSBURY.
Horse-Collars.
No. 155,733. Patented Oct. 6, 1874.
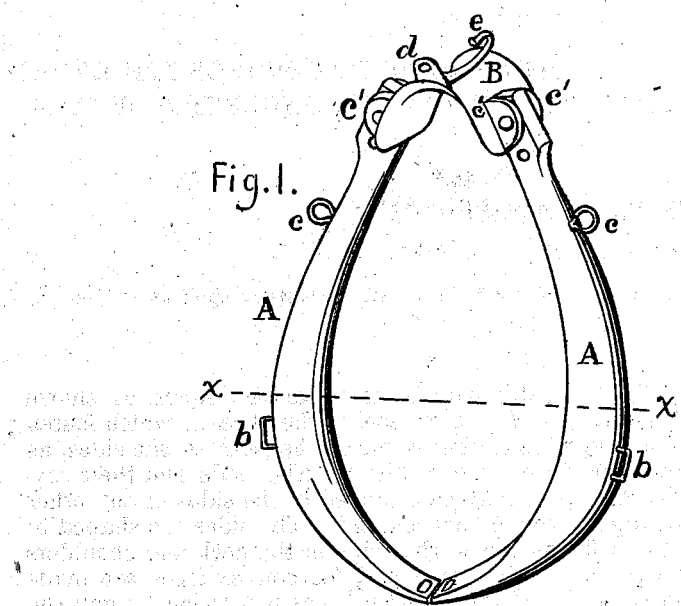
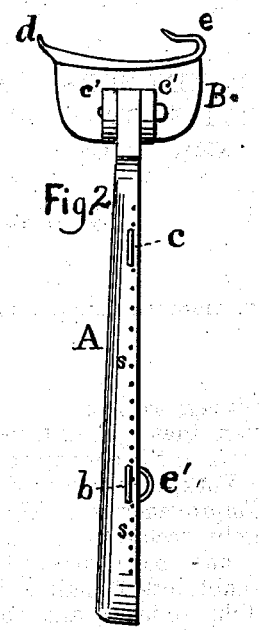
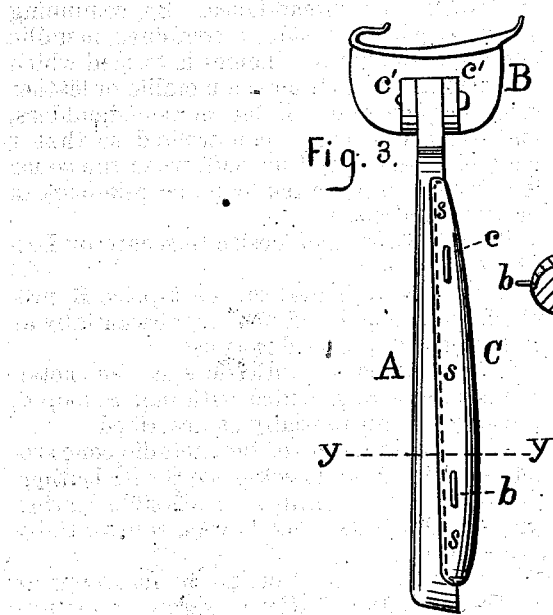
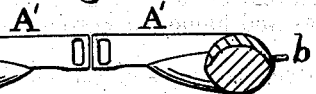
Witnesses
G. B. Towles.
A. P. Lacey.
Inventor:
Andrew B. Kingsbury
By W. Burris
Atty.

UNITED STATES PATENT OFFICE.

ANDREW B. KINGSBURY, OF UTICA, ASSIGNOR OF TWO-THIRDS HIS RIGHT TO WILLIAM DENT, OF MOHAWK, AND EDWIN L. KINGSBURY, OF HAMILTON, NEW YORK.

IMPROVEMENT IN HORSE-COLLARS.

Specification forming part of Letters Patent No. 155,733, dated October 6, 1874; application filed July 17, 1874.

*To all whom it may concern:*

Be it known that I, ANDREW B. KINGSBURY, of Utica, in the county of Oneida and State of New York, have invented certain new and useful Improvements in Horse-Collars; and I do hereby declare that the following is a full, clear, and exact description thereof, which will enable others skilled in the art to which it pertains to make and use the same, reference being had to the accompanying drawings and to the letters of reference marked thereon, which form a part of this specification.

Figure 1 is a perspective view. Fig. 2 is a side view of the collar with neck-piece attached. Fig. 3 is a side view of the collar with pads attached. Fig. 4 is a cross-section of the collar with pads, on line $y\ y$ of Fig. 5.

My invention relates to a combined reversible horse collar and hames, as hereinafter described.

A A are the curved sides of the combined collar and hames, made of metallic concavo-convex plates, and are provided with draft-hooks or lugs $b\ b$ and rein loops or rings $c\ c$. B is a neck-piece of metal, properly shaped and provided with a strap-loop, $d$, and rein-hook $e$, and lugs $c'\ c'$ having holes to receive the bolts or screws which connect the upper ends of the sides with the neck-piece, forming a pivotal or hinged joint to allow the sides to open and close in adjusting the collar on or removing it from the horse's neck. The upper ends of the sides are made with several holes, to adjust the collar to any required size, and the lower ends are made with holes $d'$ to receive the fastening-straps. C C are pads fitted in the concavities $b'$ of the sides, as shown in Fig. 6 of the drawings. The sides A are provided with holes $s$ near the edges, as shown in Fig. 2, to receive the threads which fasten the leather cover of the pads to the sides, as seen at S in Fig. 3. The pads and their covers may be attached to the sides in any other convenient manner. The sides are shaped to fit and work easily on the neck and shoulders of the horse, and the convex faces are made perfectly smooth, so as not to rub or gall the neck or shoulders, and they may be made with or without the thread-holes. By combining the pads with the sides a combined metallic and leather collar and hames is formed, which is reversible, and either the metallic or leather sides may be used on the horses' shoulders, and the neck-piece is constructed so that it may be reversed, end for end, when the collar is reversed, to place the loop and rein-hook in proper positions.

What I claim, and desire to secure by Letters Patent, is—

1. In a horse-collar, the neck-piece B, provided with loop $d$ and hook $e$, substantially as and for the purposes described.

2. In combination with sides A, the metallic neck-piece B, provided with lugs $c'$, loop $d$, and hook $e$, substantially as described.

3. The combination of the metallic concavo-convex sides A' and neck-piece B with leather-covered pads C, forming a reversible leather and metallic collar and hames, substantially as described.

In testimony that I claim the foregoing as my own invention, I affix my signature in presence of two witnesses.

ANDREW B. KINGSBURY.

Witnesses:
WILLIAM DENT,
EDWIN L. KINGSBURY.